N. BEAUDIN.
AUXILIARY PROPELLING ATTACHMENT FOR AEROPLANES.
APPLICATION FILED MAY 5, 1920.
1,362,466. Patented Dec. 14, 1920.
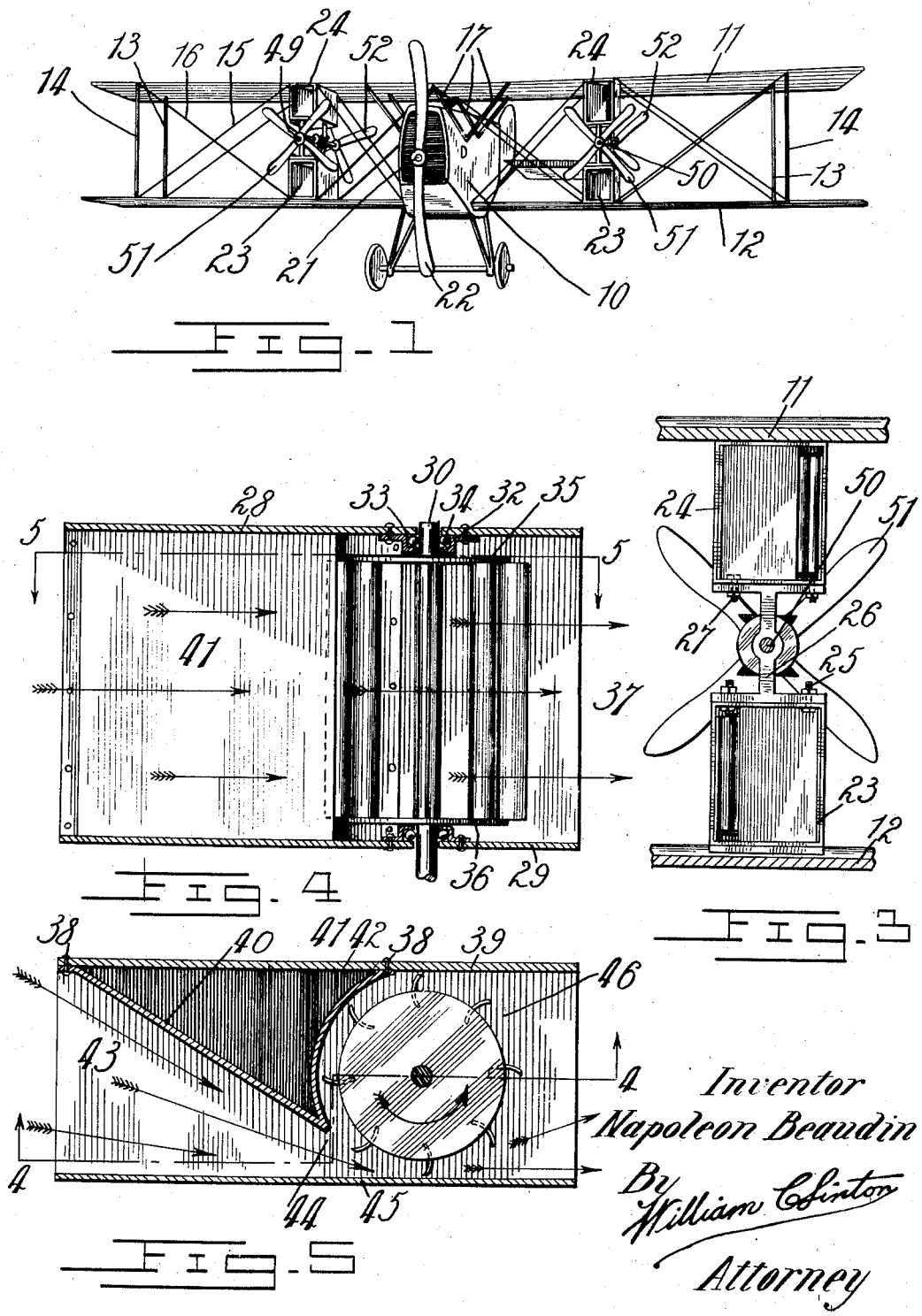

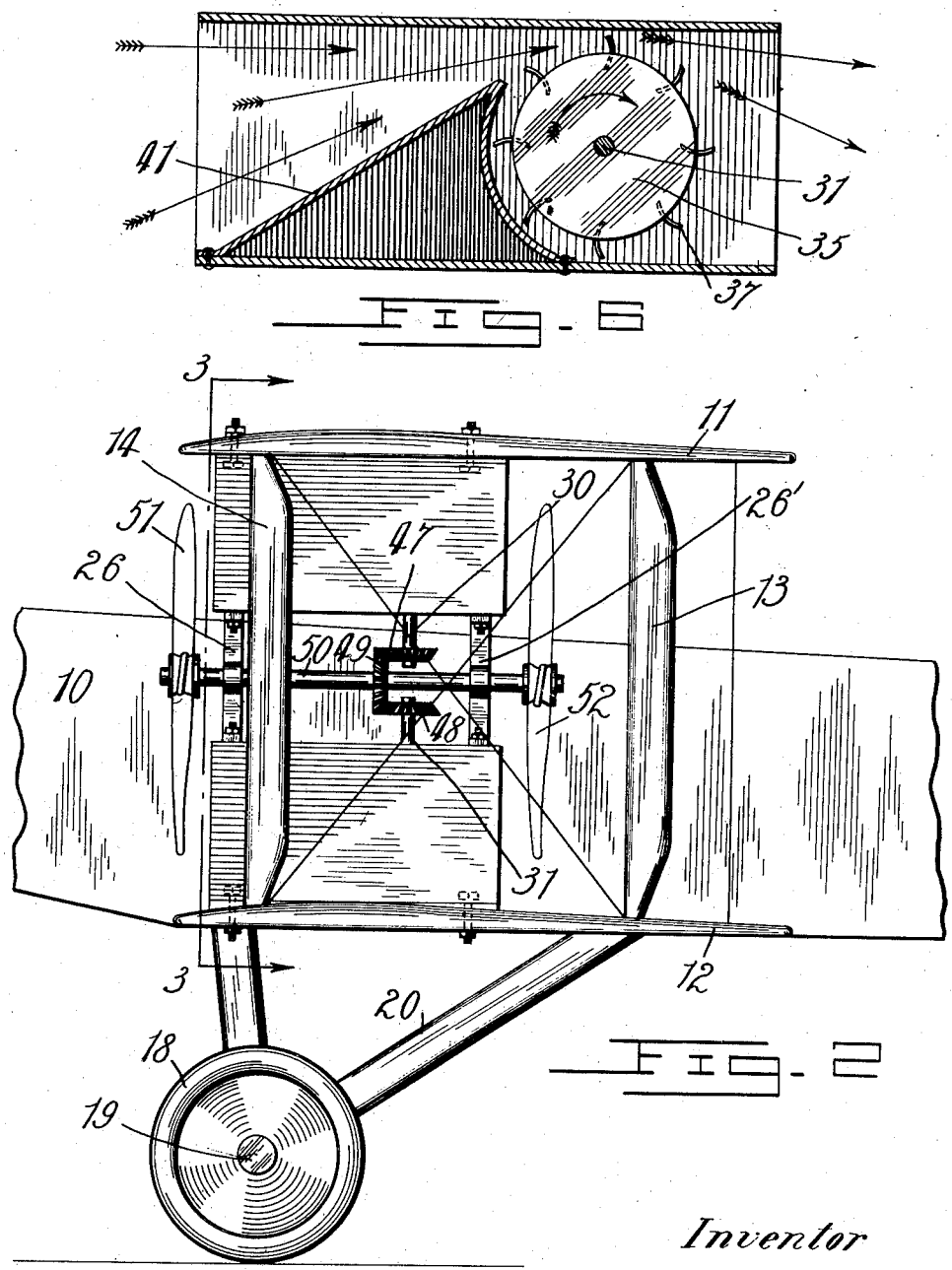

N. BEAUDIN.
AUXILIARY PROPELLING ATTACHMENT FOR AEROPLANES.
APPLICATION FILED MAY 5, 1920.

1,362,466.

Patented Dec. 14, 1920.

Inventor:
Napoleon Beaudin
By William Clinton
Attorney

UNITED STATES PATENT OFFICE.

NAPOLEON BEAUDIN, OF MONTREAL, QUEBEC, CANADA.

AUXILIARY PROPELLING ATTACHMENT FOR AEROPLANES.

1,362,466.   Specification of Letters Patent.   Patented Dec. 14, 1920.

Application filed May 5, 1920. Serial No. 379,128.

*To all whom it may concern:*

Be it known that I, NAPOLEON BEAUDIN, a subject of the King of Great Britain, residing at Montreal, Province of Quebec, Canada, have invented certain new and useful Improvements in Auxiliary Propelling Attachments for Aeroplanes; and I do hereby declare that the following is a full, clear, and exact description of the invention, such as will enable others skilled in the art to which it appertains to make and use the same.

The present invention relates to improvements in aeroplanes and the like and the principal object is to stabilize the power plant for speed or pulling power.

Another object of the invention is to provide for propelling apparatus independent of the main power plant, and which will operate as an auxiliary thereof.

A further object of the invention is to provide independent tractors and pushers adapted for actuation by the air pressure encountered thereof.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the drawings:

Figure 1 is a perspective view of a biplane, illustrating the application of my invention thereto;

Fig. 2 is a fragmental side view of the biplane, magnified to illustrate the operative parts of the invention;

Fig. 3 is a vertical section on line 3—3 of Fig. 2;

Fig. 4 is a vertical section on line 4—4 of Fig. 5; illustrating one of the rotor casings and rotors;

Fig. 5 is a horizontal section on line 5—5 of Fig. 4;

Fig. 6 is a similar horizontal section of the opposite rotor casing and rotor;

Figure 7:
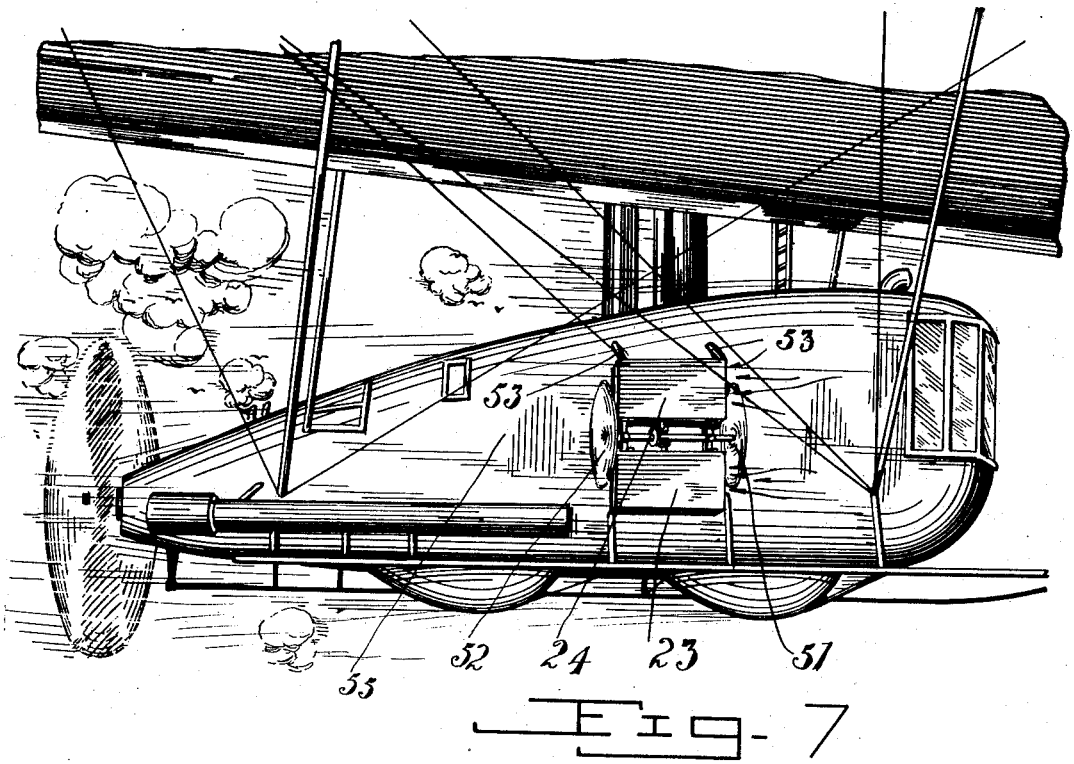
Fig. 7 is a side elevation of a dirigible gondola illustrating the invention attached thereto; and, Fig. 8 is a front elevation of the same showing a portion of the gas compartment in section.

Referring to the figures by numerals of reference, 10 designates the fuselage and 11 and 12, the upper and lower planes of a biplane type of aeroplane. The planes 11 and 12 are connected adjacent their outer ends by the vertical struts 13 and 14. Diagonal struts 15 and 16 are connected in any appropriate manner to the confronting surfaces of the planes 11 and 12 and the diagonal struts 17 are connected to the upper part of the fuselage 10 and the upper plane 11 for supporting the said fuselage upon the said planes.

The aeroplane proper is supported upon the wheels 18 mounted on the axle 19 in the wheel forks 20 connected to the front end of the fuselage 10. An explosive engine not illustrated is arranged within the forward part of the fuselage and drives a shaft 21 on which a propeller 22 is mounted.

The above description is common to the ordinary aeroplane construction and does not form a part of the present invention.

As a means for stabilizing the main power plant for the aeroplane, I provide at each side of the fuselage 10, the rectangular casings 23 and 24.

The lower casings 23 are preferably bolted to the lower plane 12, while mounted on the top of casings 23 and secured thereto by bolts 25 are the standard uprights 26 and 26' of double angle bar configuration. The upper casings 24 are secured to the upper part of the uprights 26 by the bolts 27 while the upper ends of casings 24 are bolted to the upper plane 11. These casings 23 and 24 preferably extend across the entire width of planes 11 and 12 and the upper and lower walls 28 and 29 of said casings are provided with openings through which extend the shafts 30 and 31. These shafts 30 and 31 are journaled in the bearing plates 32 formed with the countersinks 33 adapted for the reception of the ball bearings 34 which latter engage the outer periphery of shafts 30 and 31.

Rotors are mounted on shafts 30 and 31 and comprise upper and lower circular plates 35 and 36 to which are secured at their opposite ends the rotor blades 37. The blades 37 are of arcuate configuration in cross section. Secured by bolts 38 to the side walls 39 of the casings are the abutment plates 40 located forwardly of the rotors. These plates 40 are formed with angularly disposed portions 41 which extend across the hollow interior of casings 23 and 24 forwardly of the rotors and are formed with arcuate extensions 42 which extend partially around the rotors. In this manner the forward part of the casings 23 and 24 are formed with triangularly disposed passages 43 the vertical area of which diminish to form the relatively restricted openings 44 adjacent the lower wall or base 45 of said casings and which leads into or communicates with the rotor chambers 46.

The upper and lower ends of shafts 30 and 31 carry the gears 47 and 48, which latter have meshing engagement with the drive gears 49 on shaft 50 mounted in the central part of the standard uprights 26 and 26'. Keyed to the opposite ends of shafts 49, are two tractors 51 and two pushers 52, at the front and rear of the rotor casings 23 and 24 and at each side of the propeller 22.

The operation of the device will now be described: As the propeller 22 is actuated the aeroplane will ascend in the usual manner and as the plane gains momentum, air will be drawn into the opening 43 of the rotor casings 23 and 24 and will, due to the restricted openings 44 enter the rotor chamber 46 under relatively high pressure and impact against the rotor blades 37, causing the rotors and consequently the shafts 30 and 31 to be actuated. This movement is imparted through gears 47 and 48 on shafts 30 and 31, to gears 49 on shaft 50. In this manner the tractors 51 and the pushers 52 are actuated to pull and push the plane and to thereby act in an auxiliary capacity to the propeller 22.

Figure 8:
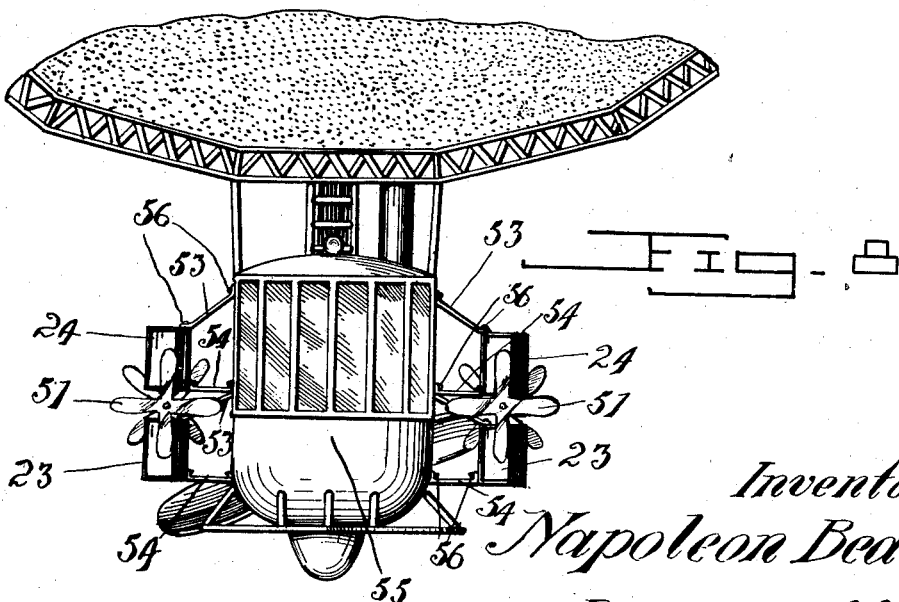

As a means for adapting my invention to a dirigible I provide the oblique brackets 53 and the horizontal brackets 54 which are secured adjacent front and rear ends of casings 23 and 24 and to steel frame on each side of gondola 55, by rivets 56. These brackets rigidly support said casings and auxiliary propelling apparatus thereof at a distance from and parallel to gondola so as to provide a sufficient air space between said gondola and casings, as shown in Fig. 8 and adapted to accelerate the power plant as therefore mentioned.

It is obvious that I have provided a device which may be attached to any type of aeroplane and which will stabilize the speed of the same, without adding to the consumption of fuel.

It is understood that the present invention may be attached to seaplanes, dirigibles or any type of aircraft and will obviously increase the stability and equilibrium of same when landing.

The present device can also be adapted to hydroplanes, motor boats or land vehicles propelled by motive power for stabilizing the speed derived therefrom.

Having thus fully described my invention, what I claim as new and desire to secure by Letters Patent is:

1. The combination with an aeroplane, dirigibles or the like having a power plant, of casings attached to said aeroplanes at each side of the power plant, shafts mounted in said casings, rotors mounted on said shafts, a standard support between each set of casings, shafts mounted in said support, gears arranged on the rotor shafts, a gear on each standard support shaft, said gear adapted for meshing union with the rotor gears, and tractor and pusher propellers mounted on the standard shafts.

2. The combination with an aeroplane, dirigibles or the like having a power plant, of casings attached to said aeroplane, dirigibles or the like at each side of the power plant, shafts mounted in said casings, rotors mounted on said shafts, a standard support between each set of casings, shafts mounted in said support, gears arranged on the rotor shafts, a gear on each standard support shaft, said gear adapted for meshing union with the rotor gears, tractor and pusher propellers mounted on the standard shafts, and means for actuating said tractor and pusher propellers.

3. The combination with an aeroplane, dirigibles or the like having a power plant, of casings attached to said aeroplane, dirigibles or the like at each side of the power plant, shafts mounted in said casings, rotors mounted on said shafts, a standard support between each set of casings, shafts mounted in said support, gears arranged on the rotor shafts, a gear on each standard support shaft, said gear adapted for meshing union with the rotor gears, tractor and pusher propellers mounted on the standard shafts, and auxiliary means for accelerating the power plant to increase the power thereof.

In witness whereof I have hereunto set my hand.

NAPOLEON BEAUDIN.